(12) United States Patent
Erwin et al.

(10) Patent No.: US 7,190,973 B1
(45) Date of Patent: Mar. 13, 2007

(54) METHOD FOR RECONFIGURING BASE STATION EQUIPMENT TO RELIEVE BLOCKING IN A HEAVILY UTILIZED CELL SECTOR

(75) Inventors: Christopher Erwin, Wesley Chapel, FL (US); Martin Chang, Lake Mary, FL (US)

(73) Assignee: Cingular Wireless II, LLC, Atlanta, GA (US)

( * ) Notice: Subject to any disclaimer, the term of this patent is extended or adjusted under 35 U.S.C. 154(b) by 151 days.

(21) Appl. No.: 10/783,335

(22) Filed: Feb. 20, 2004

(51) Int. Cl.
*H04B 1/38* (2006.01)
*H04M 1/00* (2006.01)
*H04Q 7/20* (2006.01)

(52) U.S. Cl. .................. 455/561; 455/453; 455/423; 455/424

(58) Field of Classification Search .......... 455/562.1, 455/561, 453, 575.1, 84, 423, 424
See application file for complete search history.

(56) References Cited

U.S. PATENT DOCUMENTS

| | | | |
|---|---|---|---|
| 5,752,161 A * | 5/1998 | Jantti et al. ............... | 455/8 |
| 6,058,317 A * | 5/2000 | Posti ......................... | 455/561 |
| 6,311,074 B1 * | 10/2001 | Luders ...................... | 455/561 |
| 6,360,106 B1 * | 3/2002 | Besson ...................... | 455/561 |
| 6,804,540 B1 * | 10/2004 | Shepherd et al. ........ | 455/562.1 |

\* cited by examiner

*Primary Examiner*—Joseph Feild
*Assistant Examiner*—Bryan Fox
(74) *Attorney, Agent, or Firm*—Parks Knowlton LLC; J. Perry Herndon, Esq.

(57) ABSTRACT

A method is disclosed for adapting base station equipment at a sectorized cell site to relieve high call blocking rates in a first heavily utilized sector. The method includes selecting a TCB cabinet corresponding to a second more sparsely utilized sector and placing first sector transceivers in a first set of designated slots of the TCB cabinet and second sector. A split receive (uplink) signal path within the second sector TCB cabinet is achieved by substituting a four input port combiner card for a conventional two input port combiner card. First and second sector receive signals are respectively directed to first and second input port pairs of the combiner card and are separately routed by the TCB cabinet backplane circuitry to the first and second sector transceivers. The foregoing method allows the cell site owner to add needed transceivers to the heavily-utilized sector without purchasing and installing a new base station.

6 Claims, 4 Drawing Sheets

METHOD FOR RECONFIGURING BASE STATION EQUIPMENT TO RELIEVE BLOCKING IN A HEAVILY UTILIZED CELL SECTOR

FIELD OF THE INVENTION

The present invention relates generally to mobile telecommunications systems, and more particularly to base station equipment for cellular and PCS systems.

DESCRIPTION OF THE PRIOR ART

In sectorized cell sites, it is not uncommon for one of the sectors to have significantly higher call traffic relative to one or more of the other sectors. This condition may result, for example, from the presence within the sector of office buildings, roadways, or other structures where large numbers of cellular telephone users are located. High call blocking rates may occur if demand in the heavily-utilized sector for voice channels exceeds the number of voice channels that can be accommodated by the base station equipment that serves the sector. In this situation, it is desirable to add more transceivers to the sector in order to increase available voice channels. However, each sector's TCB cabinet is limited to housing a fixed number (typically 8 or 16) of transceivers. If all of the transceiver slots in the TCB cabinet of the heavily-utilized sector are occupied, then no more transceivers can be added to the sector without purchasing new base station equipment. The costs of purchasing and installing such new base station equipment are substantial, and increasing cost competitiveness in the cellular telephone industry has caused cellular carriers to reduce capital expenditures associated with the purchase of new cell site equipment. There is thus a need for a method to reduce call blocking rates in a heavily utilized cell sector that does not require purchase of expensive new base station equipment.

SUMMARY

Briefly described, an embodiment of the invention provides a method for reconfiguring existing base station equipment in a sectorized cell site to allow additional transceivers to serve a first, heavily utilized sector and thereby increase the number of available traffic channels in the first sector. The method involves placing additional transceivers in unoccupied slots of a TCB cabinet serving a second, more sparsely utilized sector, and then establishing a receive path between the added transceivers and the antennas of the first sector.

In accordance with a specific implementation of the method, the added first sector transceivers and second sector transceivers are placed in alternating slots of the second sector TCB cabinet such that the added first sector transceivers occupy the odd-numbered slots and the second sector transceivers occupy the even-numbered slots. To split the receive path in the second sector TCB cabinet between the first and second sector transceivers, the two-input port distribution card in the TCB cabinet is replaced with a four-input port distribution card. Standard backplane circuitry in the TCB cabinet routes receive signals applied to the first pair of input ports (referred to as the A1 and A2 ports) to the transceivers inserted into the odd-numbered slots and receive signals applied to the second pair of input ports (referred to as the B1 and B2 ports) to the transceivers inserted into the even-numbered slots. The first pair of input ports are connected to the multicoupler cards in the first sector ANPC cabinet, which are in turn coupled to the first sector receive antennas, and the second pair of input ports are connected to the multicoupler cards in the second sector ANPC cabinet. Receive paths are thereby established between the first sector antennas and the added first sector transceivers, and between the second sector antennas and the second sector transceivers.

By utilizing the foregoing method, the cell site owner can add more transceivers to a heavily utilized sector while avoiding the expense associated with the purchase and installation of a new base station.

DETAILED DESCRIPTION OF PREFERRED EMBODIMENTS

Figure 1:
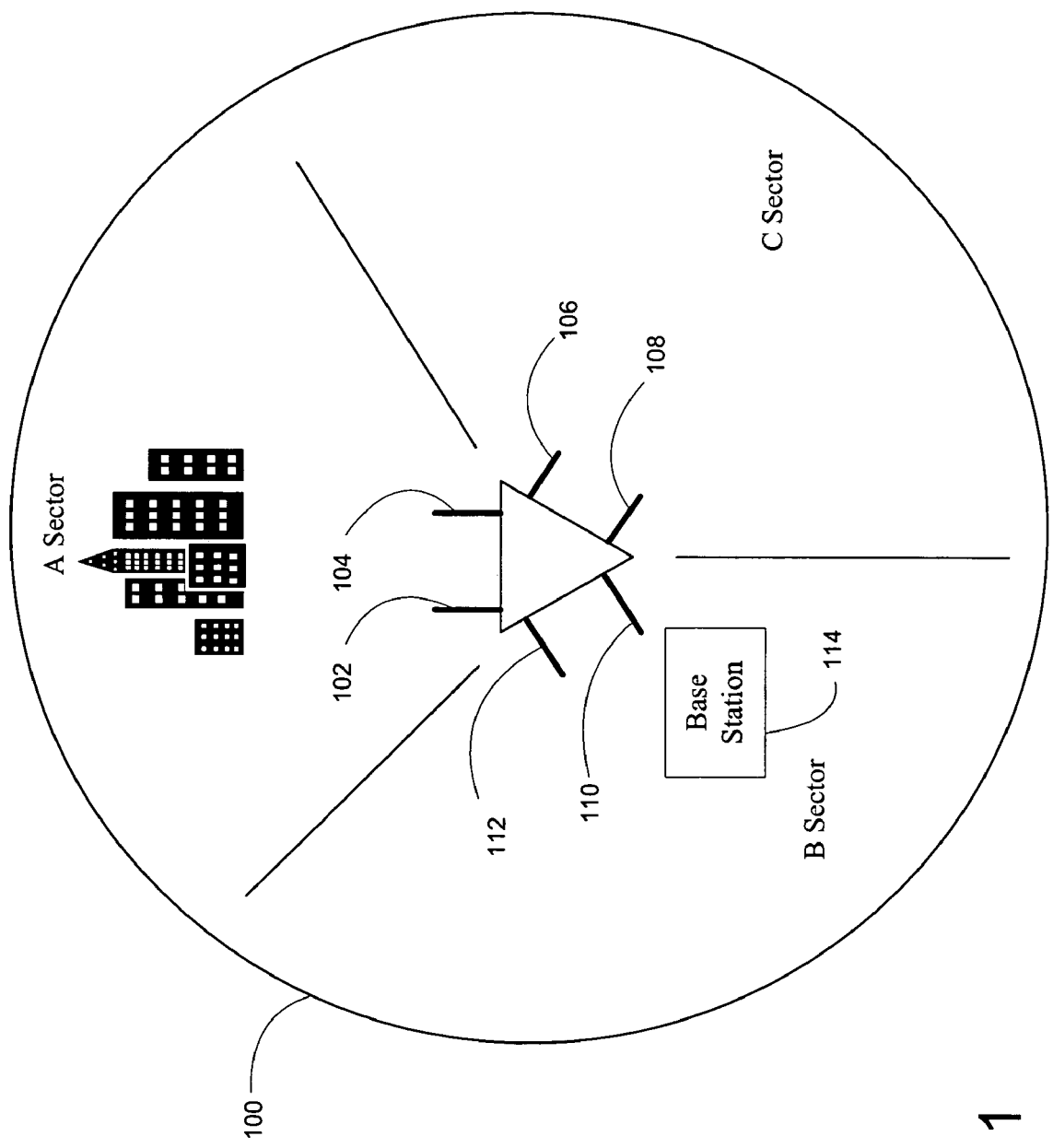
FIG. 1 is a symbolic representation of a cell site in which the method of the invention may be implemented.

FIG. 1 is a symbolic description of an exemplary cell site 100 that has been partitioned into three sectors, referred to herein as A Sector, B Sector, and C Sector. Each sector has a unique set of directional antennas that transmit and receive RF signals to and from mobile stations located within that sector. Each antenna set includes first and second diversity antennas for uplink (receive) signals; the downlink (transmit) signals may be duplexed into one of the diversity antennas or may be routed to a separate transmission antenna. In the present example, A Sector is served by antennas 102 and 104, B Sector is served by antennas 106 and 108, and C Sector is served by antennas 110 and 112. A base station 114 includes equipment for processing the received and transmitted signals to provide voice and other services to mobile stations. For the purpose of explication, we assume that A Sector has significantly greater demand for voice channels relative to B Sector. The higher utilization in A Sector may result from the presence in the sector of office buildings, major roadways, and/or other structures where users of mobile stations (e.g., cellular or PCS telephones) are clustered. Those skilled in the wireless telecommunications art will recognize that while three sectors are depicted in the figure, cell sites may be divided into a lesser number (i.e., two) or greater number of sectors, and will further recognize that cell site 100 represents one of many networked cell sites in a wireless (cellular or PCS) system.

The maximum number of voice channels that may be used by mobile stations within a sector of cell site 100 (and hence the number of voice calls that can be supported) will be determined by the number of transceivers connected via receive and transmit paths to the antennas that serve the sector. Each transceiver is tuned to a specific channel pair, which includes an uplink frequency and a downlink frequency. In IS-136 systems, which employ time division multiple access (TDMA) for call multiplexing, three voice calls are carried on a single channel pair. Thus, the maximum number of voice calls supported within a sector in IS-136 systems will be equal to three times the number of transceivers connected to the sector's antenna set. Unacceptably high call blocking rates will occur if demand for voice calls in the sector significantly exceeds the maximum number of calls that can be handled by the sector's transceivers.

Figure 2:
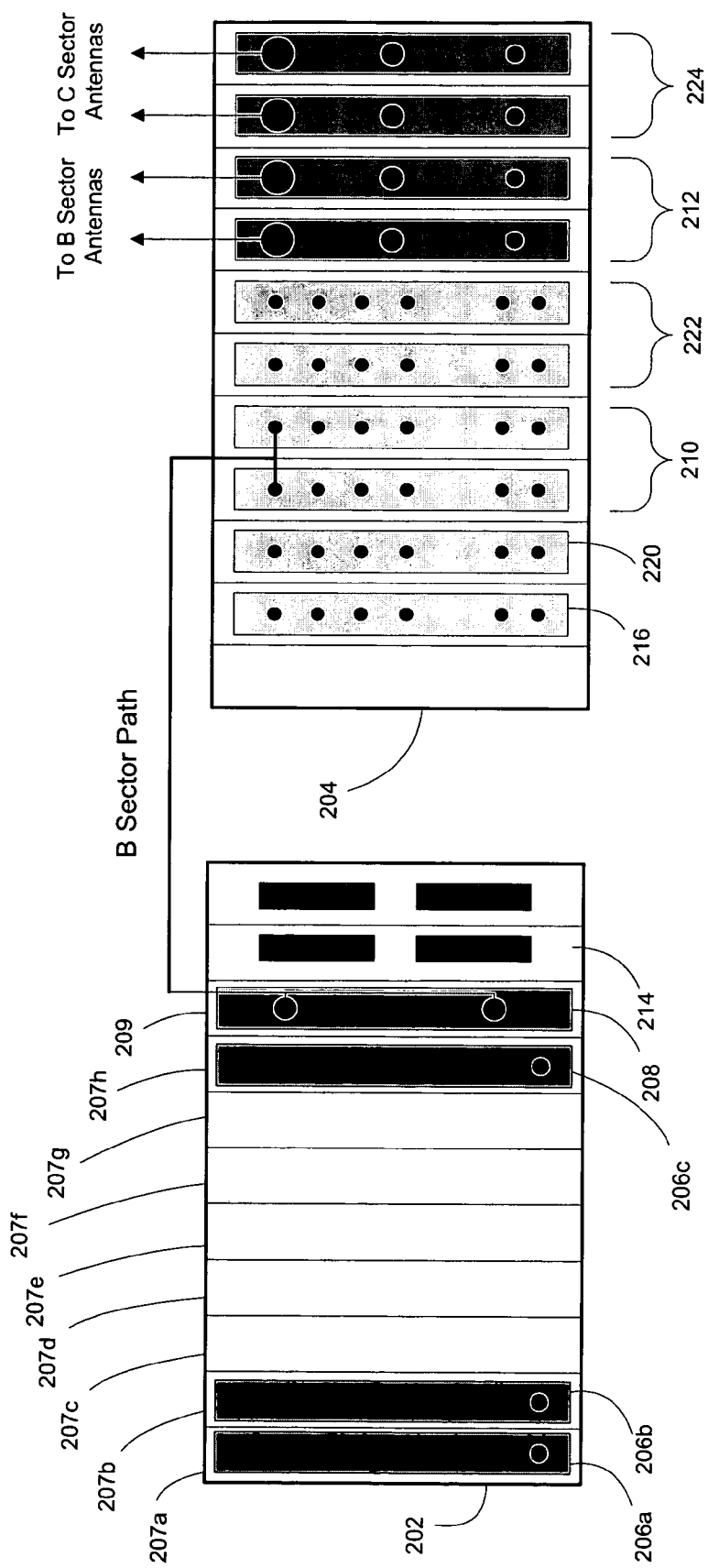
FIG. 2 depicts exemplary cell site base station equipment prior to reconfiguration.

FIG. 2 depicts standard commercial base station 114 equipment of the type sold by Ericsson of Stockholm, Sweden (for example, models RBS 882 and RBS 884) and which have been widely installed in wireless telecommunication markets throughout the U.S. The base station equipment includes a TCB cabinet for each sector, which houses a set of modularized transceivers and a combiner card. Two ANPC cabinets house multicoupler cards, duplexers, and other circuitry for handling RF signals directed to and from the cell site antennas. Each TCB cabinet includes a fixed number of transceiver slots which house individual transceivers and connect them to backplane circuitry. The transceivers are configured as modularized cards so that they can be easily inserted into and removed from the transceiver slots, and are provided with a set of connectors that mate with a complementary set of connectors located within the transceiver slot to connect the transceiver circuitry to backplane circuitry of the TCB cabinet, which routes signals to a combiner card in the manner discussed below. The TCB cabinet is provided with a fixed number of transceiver slots, typically 8 or 16. Since, in prior art practice, each sector utilizes a single dedicated TCB cabinet, no additional transceivers can be added to the sector once all of the transceiver slots in the associated TCB cabinet have been filled.

In FIG. 2, a TCB cabinet 202 and ANPC cabinet 204 corresponding to a sparsely utilized cell site sector (for example, B Sector in the FIG. 1 example) are depicted. It is noted that due to the sparse utilization of B Sector, only two transceivers (numbered 206a and 206b) are required to handle the relatively low volume of voice traffic in the sector. Transceivers 206a,b occupy transceiver slots 207a,b of TCB cabinet 202, while transceiver slots 207c–g are unoccupied. The remaining transceiver slot 207h is occupied by transceiver 206c, which handles uplink and downlink signals transmitted on the control channel pair of B Sector. TCB cabinet 202 additionally houses a two input-port combiner card 208 (Ericsson model no. PSP 8) configured to combine receive (uplink) RF signals and to direct the combined receive signals via backplane circuitry to transceivers 206a,b. Combiner card 208 is placed in combiner card slot 209, which is adapted with a set of connectors that releasably engage complementary connectors of combiner card 208 such that its output is directed to the TCB cabinet 202 backplane circuitry. The two input ports of combiner card 208 are cabled to the outputs of multicoupler cards 210 housed in ANPC 204, which receive input from duplexer cards 212, also housed in ANPC 204. The duplexer cards 212 are in turn connected to the B Sector antennas 110 and 112. Receive paths are thereby established between B Sector antennas 110 and 112 and transceivers 206 a,b via (in sequence) duplexer cards 212, multicoupler cards 210, combiner card 208, and the TCB cabinet 202 backplane circuitry. For simplicity, cabling between duplexer cards 212 and multicoupler cards 210 has been omitted from FIG. 2. TCB cabinet 202 also includes a set of slots for housing delink connector (DECON) cards 214, which communicate with transceivers 206a,b,c and with the base station controller and which administer standard control functions. ANPC cabinet 204 also houses an RFTL (test) card 216 utilized for various testing functions. The operation of the DECON and RFTL cards are outside the scope of the invention and will not be discussed herein. RFTL card 220, multicoupler cards 222, and duplexer cards 224, housed in ANPC cabinet 204, handle RF signals directed to and from the C Sector antennas 106 and 108. Multicoupler cards 222 are cabled to a combiner card housed in the C Sector TCB cabinet (not shown).

Figure 3:
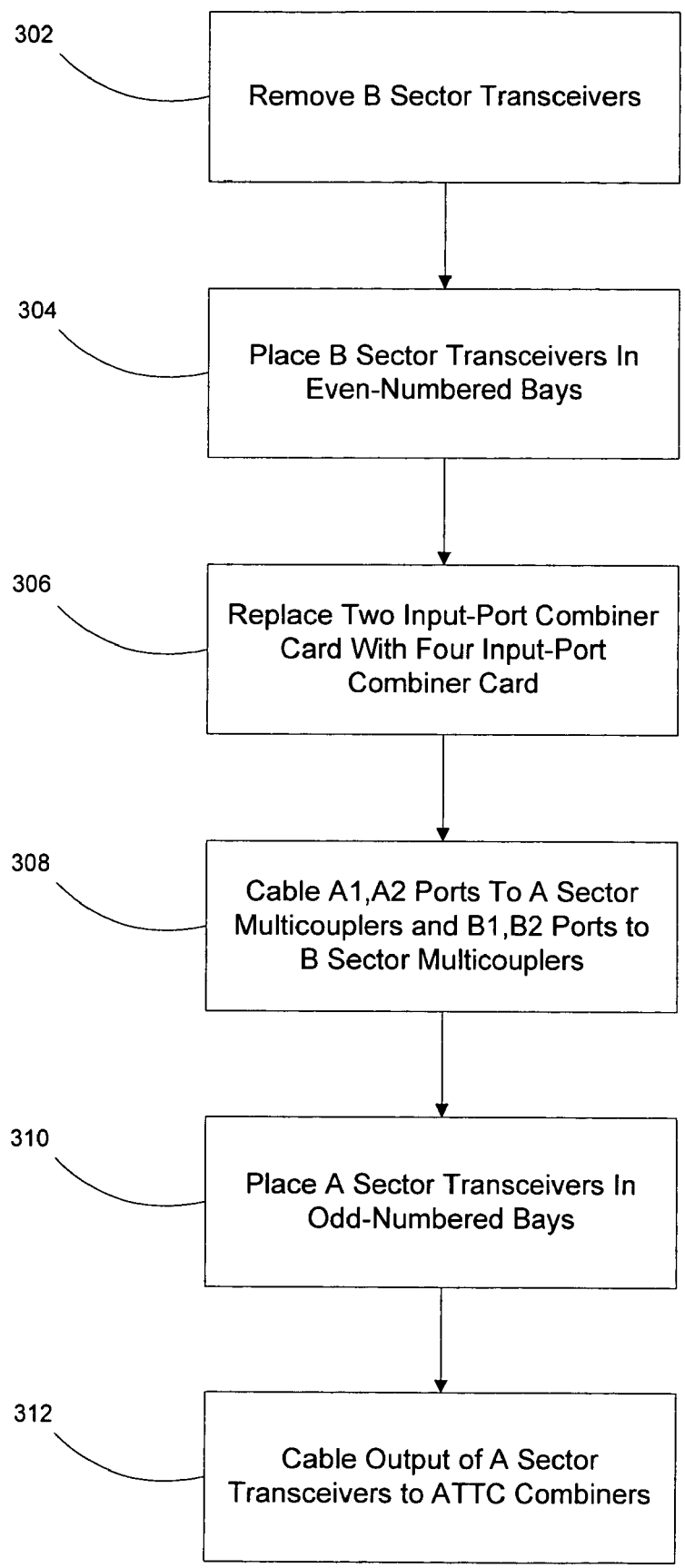
FIG. 3 is a flow chart depicting the steps of the base station equipment reconfiguration method of the invention.
Figure 4:
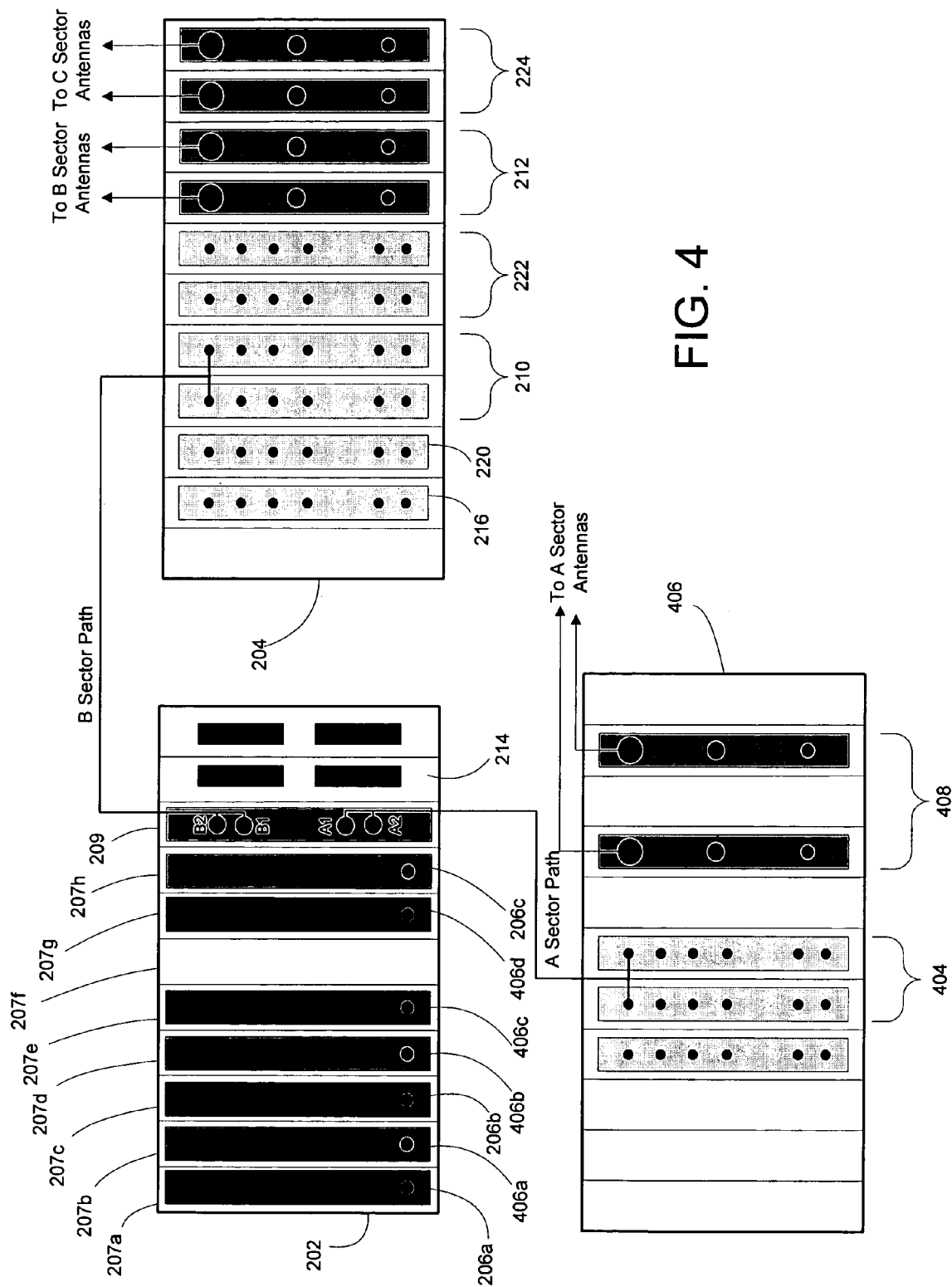
FIG. 4 depicts the base station equipment shown in FIG. 2 following reconfiguration in accordance with the invention.

For the purpose of explication, we can assume that all of the transceiver slots of the A Sector (heavily utilized) TCB cabinet (not shown) are occupied and that no additional transceivers may be added to the A Sector TCB cabinet. We also assume that the A Sector transceivers are incapable of handling the high call traffic demand of mobile stations in A Sector and that an unacceptably high call blocking rate has resulted. The present invention provides a method for reconfiguring base station equipment to add transceivers to A Sector and thereby relieve the call blocking rate in that sector. The preferred implementation of the method may best be described with reference to FIGS. 3 and 4. The method 300 involves a first step 302 of removing all the transceivers (with the exception of the transceiver handling the control channel pair) from the transceiver slots of a TCB cabinet corresponding to a sparsely utilized sector. In the above-discussed example, transceivers 206a,b are removed from TCB cabinet 202. Next, in step 304, transceivers 206a,b are placed in alternate even-numbered slots 207b and 207d, for reasons that are discussed below. As necessary, appropriate configuration changes may be made in software running on base station 114 to reflect the changed placement of the B sector transceivers.

The PSP 8 two input-port combiner card 208 is then removed from combiner card slot 209 and replaced with a four input-port combiner card 402 (Ericsson model no. PSP 4), step 306. Four input-port combiner card 402 is provided with first and second pairs of input ports respectively labeled as the A1, A2 and B1, B2 input ports. Typically, four input-port combiner cards such as the PSP 4 card have been used in cell site base equipment for the purpose of providing redundant connections. In step 308, the A1, A2 input ports are then connected via cables to multicoupler cards 404 housed in the ANPC cabinet 406 associated with A Sector, and the B1, B2 input ports are connected via cables to multicoupler cards 210 in B/C Sector ANPC cabinet 204. A Sector ANPC cabinet 406 is configured similarly to B/C Sector ANPC cabinet 406 and includes (in addition to multicoupler cards 404) a set of duplexer cards 408 that are connected to A Sector antennas 102, 104 and which direct uplink (receive) signals into multicoupler cards 404 through cabling (not depicted) connected between corresponding receive ports of the duplexer and multicoupler cards.

Next, in step 310, transceivers 406a,b,c,d are placed in alternate, odd-numbered slots 207a, 207c, 207e, and 207g of B Sector TCB cabinet 202. As will be discussed in further detail below, receive and transmit paths are established between transceivers 406a,b,c,d and antennas 102, 104 of A Sector so that A Sector is provided with additional transceivers to handle the high call demand and thereby reduce call blocking rates. While the example described and depicted herein has four A Sector transceivers being placed in the B Sector TCB cabinet 202, a greater or lesser number of transceivers may be used, depending on the number of unoccupied odd-numbered slots available in the B Sector TCB cabinet and the number of additional transceivers required to support the A Sector call traffic. The base station 114 software may then be reconfigured in accordance with the placement of the additional A Sector transceivers. Finally, in step 312, the output of transceivers 406a,b,c,d are connected by cables to combiners housed in the autotune combiner cabinet (not shown) to establish a transmit (downlink) path between transceivers 406a,b,c,d and Sector A antennas 102 and 104.

The split receive path enabling co-location of A Sector transceivers 406a,b,c,d and B Sector transceivers 206a,b within a single TCB cabinet 202 is effected by the four input-port combiner card 402 and standard backplane circuitry of TCB cabinet 202. Uplink signals from A Sector antennas 102, 104 are directed through duplexer cards 408 and multicoupler cards 404 and are applied to input port pair A1,A2. The A Sector uplink signals are then combined in combiner card 402 and routed by TCB cabinet 202 backplane circuitry to A Sector transceivers 406a,b,c,d located in the odd-numbered transceiver slots 207a,c,e,g. Uplink signals from B Sector antennas 110,112 pass through duplexer cards 212 and multicoupler cards 210 and enter input pair B1,B2. The B Sector uplink signals are combined in combiner card 402 and routed through TCB cabinet backplane circuitry to B Sector transceivers located in the even-numbered slots 207b,d.

It will be appreciated by those skilled in the art that the above-described method overcomes the limitations associated with Ericsson cell site base station equipment, wherein the number of slots in a sector's TCB cabinet places an upper limit on the number of transceivers that serve the sector. Employing the method of the invention also advantageously avoids the need for purchase and installation of a new base station if a sector having a full transceiver bay in its TCB cabinet experiences high blocking rates.

It will be recognized by those skilled in the art that, while the invention has been described above in terms of preferred embodiments, it is not limited thereto. Various features and aspects of the above invention may be used individually or jointly. Further, although the invention has been described in the context of its implementation in a particular environment and for particular applications, those skilled in the art will recognize that its usefulness is not limited thereto and that the present invention can be beneficially utilized in any number of environments and implementations.

What is claimed is:

1. A method for reconfiguring base station equipment of a sectorized cell site to relieve high call blocking rates in a first, heavily utilized sector, the method comprising:
    selecting a TCB cabinet housing transmission equipment, the TCB cabinet corresponding to a second sector having less call traffic relative to the first sector, the TCB cabinet having a plurality of transceiver slots;
    placing a set of first sector transceivers in a first designated set of transceiver slots of the TCB cabinet;
    placing a set of second sector transceivers in a second designated set of transceiver slots of the TCB cabinet;
    placing a combiner card having first and second input port pairs in the associated slot of the TCB cabinet;
    connecting the first input port pair of the combiner card to first sector multicouplers;
    connecting the second input port pair of the combiner card to second sector multicouplers; and
    wherein backplane circuitry of the TCB cabinet directs combined uplink signals from the first input port pair to the first designated set of transceiver slots and directs combined uplink signals from the second input port pair to the second designated set of transceiver slots,
    the first designated set of transceiver slots being odd-numbered slots of the TCB cabinet,
    the second designated set of transceiver slots being even-numbered slots of the TCB cabinet,
    the odd-numbered and even-numbered slots utilizing separate paths of the backplane circuitry of the TCB cabinet so as to prevent signals of the transceivers placed in the odd-numbered slots from mixing with signals of the transceivers placed in the even-numbered slots.

2. The method of claim 1, further comprising establishing a transmission path between the set of first sector transceivers and the first sector antenna.

3. The method of claim 1, wherein the set of first sector transceivers comprises a plurality of transceivers.

4. A base station apparatus for a sectorized cell site having at least a first and a second sector, the base station configured to relieve high call blocking rates in the first sector, comprising:
    a TCB cabinet housing transmission equipment, the TCB cabinet having a plurality of transceiver slots;
    a set of first sector transceivers located in a first designated set of transceiver slots of the TCB cabinet;
    a set of second sector transceivers located in a second designated set of transceiver slots of the TCB cabinet;
    a combiner card having first and second input port pairs located in an associated slot of the TCB cabinet;
    a connection between the first input port pair of the combiner card and first sector multicouplers;
    a connection between the second input port pair of the combiner card and second sector multicouplers; and
    backplane circuitry in the TCB cabinet configured to route combined uplink signals from the first input port pair to the first designated set of transceiver slots and to route combined uplink signals from the second input port pair to the second designated set of transceiver slots,
    the first designated set of transceiver slots being odd-numbered slots of the TCB cabinet,
    the second designated set of transceiver slots being even-numbered slots of the TCB cabinet,
    the odd-numbered and even-numbered slots utilizing separate paths of the backplane circuitry of the TCB cabinet so as to prevent signals of the transceivers placed in the odd-numbered slots from mixing with signals of the transceivers placed in the even-numbered slots.

5. The base station apparatus of claim 4, wherein the set of first sector transceivers comprises a plurality of transceivers.

6. The base station apparatus of claim 4, further comprising a first ANPC cabinet for housing the first sector multicouplers and a second sector ANPC cabinet for housing the second sector multicouplers.

* * * * *